July 30, 1968   M. P. CRIVELLO   3,394,951
INTERNAL PIPE COUPLING
Filed Aug. 22, 1967
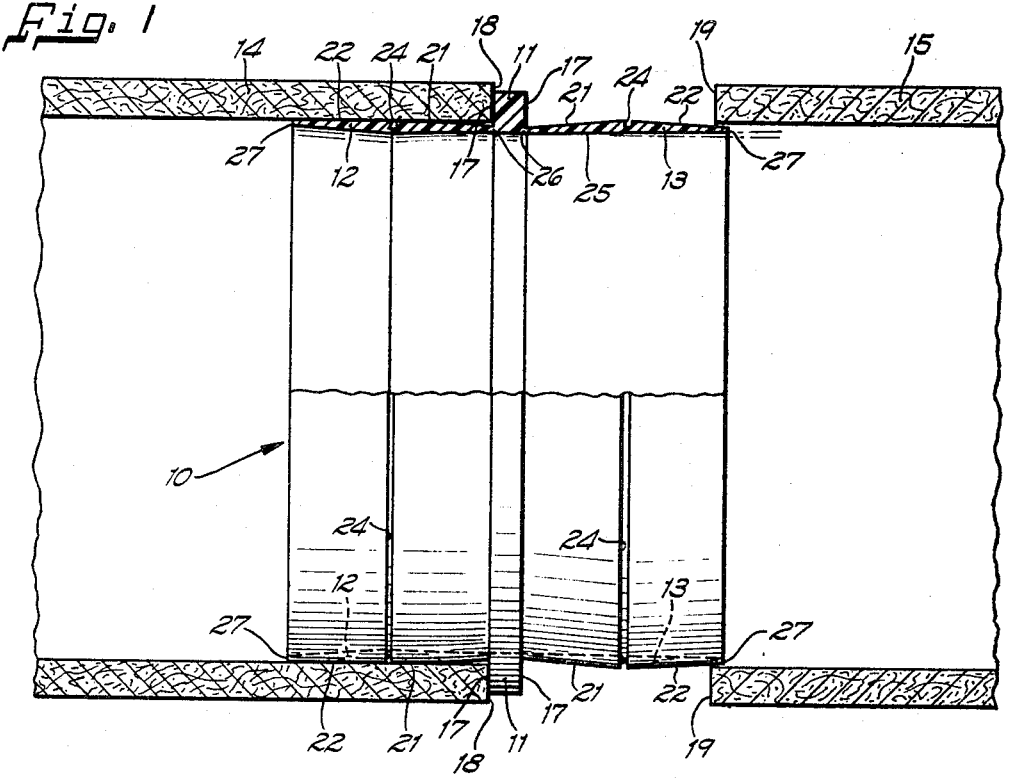
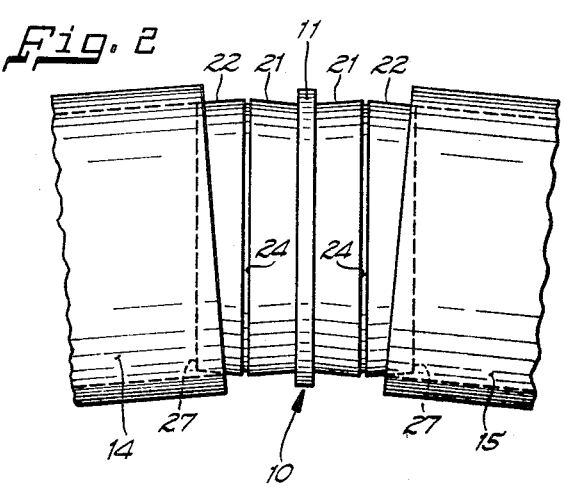
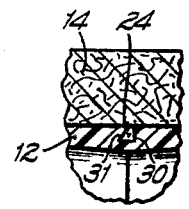
INVENTOR.
Mike P. Crivello
By Fred Wiriott
Attorney

ABSTRACT OF THE DISCLOSURE

United States Patent Office 3,394,951
Patented July 30, 1968

3,394,951
INTERNAL PIPE COUPLING
Mike P. Crivello, St. Francis, Wis., assignor to McGraw-Edison Company, Milwaukee, Wis., a corporation of Delaware
Continuation-in-part of application Ser. No. 450,426, Apr. 23, 1965. This application Aug. 22, 1967, Ser. No. 662,430
10 Claims. (Cl. 285—109)

ABSTRACT OF THE DISCLOSURE

An internal pipe coupling formed of a single piece of material, such as high density polyethylene, which is characterized by a relatively high tensile, compressive and flexural yield strength and a relatively high flexural modulus for connecting axially adjoining conduit sections having unthreaded interior end surfaces. The coupling comprises a pair of spaced, axially extending coupling portions with a central, radially outwardly extending barrier annulus therebetween. Each of the coupling portions has a substantially cylindrical internal surface and a pair of opposed frustoconical exterior surfaces tapered at approximately 2° and separated by an annular groove with the portions of the frustoconical surfaces of greatest diameter being adjacent the groove.

Related application

This application is a continuation-in-part of co-pending application Ser. No. 450,426, filed Apr. 23, 1965, and now abandoned.

Background of the invention

This invention relates to couplings, and more particularly to a device for coupling conduit having unmachined ends.

In the coupling of certain types of conduit, such as that composed of bituminized fiber, it is necessary that the coupling member provide a water-tight joint and yet present a low friction path for electrical cable which may be pulled through the conduit. In addition, it is desirable that the coupling be made without the necessity for machining the conduit ends for economy and speed of field installation.

It is also desirable that the coupling not project beyond the outer surface of the conduit so that there will be no interference with conduit supporting structures which may be fabricated to receive conduit of a particular size.

It is an object of the invention to provide a coupling member for the unmachined ends of conduit which provides a water-tight joint and an unobstructed low friction path for cable.

Another object of the invention is to provide a conduit coupling member which may be readily field assembled.

A further object of the invention is to provide a conduit coupling member which allows a degree of misalignment between conduit sections during assembly.

A still further object of the invention is to provide a coupling member which does not protrude beyond the outer surface of the conduit sections.

Summary of the invention

An internal conduit coupling member formed of a nonmetallic material characterized by high tensile, compressive and flexural yield strength and a high flexural modulus and having a generally cylindrical internal surface and a pair of axially extending coupling surface portions extending from a central portion and in each axial direction, the coupling surface portions comprising a pair of generally diverging surfaces formed at a relatively small oblique angle with respect to the internal surface and which have their maximum diameter ends adjoining and axially separated by a circumferential groove.

Brief description of the drawings

FIG. 1 is a side elevational view, with parts broken away (showing the coupling member according to the invention, along with sections of the conduit being joined;

FIG. 2 is a side elevational view showing the coupling member and associated conduit ends in a partially assembled position;

FIG. 3 is a partial sectional view of the coupling member and conduit in a fully assembled position; and FIG. 4 is a fragmentary view illustrating the deformation that occurs in the coupling member during assembly.

Detailed description of the preferred embodiment

Referring now to FIG. 1, the coupling member 10 is shown to include a projecting central annulus 11 and a pair of axially extending coupling portions 12 and 13 joined to the central portion 11. The central annulus 11 projects radially outward and has an outside diameter which may be the same as that of the adjoining conduit sections 14 and 15, or slightly smaller, as shown, to assure that no portion of the coupling will protrude beyond the outside diameter of the associated conduit sections. A pair of radial surfaces 17 are formed at each axial side of the annulus so that, when assembled, they will abut the squarely formed axial ends 18 and 19 of the respectively adjoining conduit portions 14 and 15.

The outer surface of each of the axially extending coupling portions 12 and 13 has a pair of generally frustoconical surfaces 21 and 22 formed thereon and arranged with their maximum diameter portions adjoining and separated by an annular groove 24. The internal surface of the portions 12 and 13 is generally cylindrical, although the sections 12 and 13 may flare outwardly to a very slight extent to facilitate resilient coupling action with the cylindrical internal surfaces of the conduit sections 14 and 15.

As a result, reduced diameter sections of the portions 12 and 13 are provided at their juncture 26 with the central portion 11 and the groove 24 to provide points of flexure for the coupling member. In addiiton, a reduced diameter portion is provided at the axial ends 27 of portions 12 and 13 to provide a minimum obstruction at the point of transition between the inner surface of the conduits 14 and 15 and the inner surface 25 of the coupling member 10.

In practice, it has been found that having the frustoconical surfaces 21 and 22 taper at approximately 2° with respect to the axis provides the desired coupling action. Prior to assembly with the conduit sections 14 and 15, as illustrated in FIG. 1, the maximum diameter of the frustoconical surfaces 21 and 22 exceeds the inside diameter of the conduit sections, while the outside diameter of the distal end 27 is smaller than the conduit inside diameter to facilitate ready insertion of the coupling into the conduit end during assembly. The latter also permits the coupling of conduit sections whose internal diameters vary to a substantial degree from their nominal value, as in the case of bituminized fiber conduit which has a wide tolerance range.

As the coupling portions 12 and 13 are forced into the cooperating conduit during assembly, the interior surface of the conduit end engages the frustoconical surface 22, causing the larger diameter portion thereof to be compressed inwardly, and simultaneously causing the remote end 25 to be deformed radially outwardly and into intimate compressive contact with the conduit inner surface.

The reduced thickness portions at the groove 24 and the ends 26 of the surfaces 21 provide points of flexure for the axially extending coupling portions 12 and 13 to permit the portion 13 to deform from its condition shown in FIG. 1 to that shown in FIG. 3. More specifically, flexure at the point 26 permits the portions 12 and 13 to be compressed inwardly so that the surface 21 moves toward parallelism and generally attempts to assume the shape of the generally cylindrical inner surface of the tubes 14 and 15, as seen in FIGS. 1 and 3. In addition, flexure at the groove 24 permits the surface 22 to be forced outwardly so as to generally assume the shape of the cylindrical inner surface of the tubes 14 and 15. As the coupling member 10 flexes at joint 26 and groove 24, the sides 31 of the groove 24 tend to collapse inwardly from their lower to their upper ends, as shown in FIG. 4.

The coupling member is normally assembled to the conduit lengths by insertion into the end thereof and with the application of an axial force to one conduit end to drive the assembly into full coupling engagement. The coupling 10, according to the instant invention, can however be utilized as shown in FIG. 2 where the initial assembly is not axial, such as would be necessary when replacing a coupling in an existing line of conduit. As shown, coupling 10 will accommodate a substantial degree of axial misalignment during initial assembly with conduit sections 14 and 15 being brought into full engagement by forcing the partially assembled coupling downward to coaxial relationship.

The coupling member 10 should be composed of a material with sufficient strength to form a relatively rigid coupling between the conduit sections 14 and 15 and to be able to withstand the forces exerted when it is driven into the ends of the conduit sections 14 and 25. On the other hand, the conduit 10 must be sufficiently flexible so that it will flex without permanent deformation at the groove 24 and joint 26, wherein the surfaces 21 and 22 can be brought into resilient, high pressure engagement with the cylindrical surface of the conduit sections 14 and 15.

One material which was found to have the desired properties is high density polyethylene which is sold under a number of trade names, such as Linear Polyethylene 3460, sold by the Eastman Chemical Company. The following is the table listing some of the physical properties of this material.

| Properties | ASTM Test Numbers | Polyethylene Hig Density |
|---|---|---|
| Tensile strength | D638, D651 | 3,100–5,500 p.s.i. |
| Elongation | D638 | 15–100%. |
| Tensile modulus | D638 | 0.6–1.5, 10$^5$ p.s.i. |
| Compressive strength | D695 | 3.200 p.s.i. |
| Flexural yield strength | D790 | 1,000 p.s.i. |
| Impact strength (½ x ½ inch notched bar, izod test). | D256 | 1.5–20, ft.-lb./in. of notch. |
| Hardness, Rockwell | D785 | D60–D70 (Shore). |
| Flexural Modulus | D790 | 100,000–260,000. |

As those skilled in the art will appreciate, variations may exist in the physical properties of the high density polyethylene of different manufacturers. In addition those skilled in the art will appreciate that high density polyethylene is merely an example of the type of material found to be effective and that other materials having similar properties may also be employed.

The coefficient of friction between the material of the coupling member 10, such as high density polyethylene, and the cable (not shown) being pulled therethrough, is substantially less than that between the cable and the conduit sections 14 and 15. It will also be appreciated that when the coupling member 10 is in its assembled condition with respect to the conduit sections 14 and 15, its internal surface 25 will be slightly elevated relative to the internal surfaces of said conduit sections. As a result, the cable is supported on the low frictional coupling members so that it may be pulled with substantially greater ease than would be the case if it were being pulled through a continuous conduit.

While only a single embodiment of the invention has been shown and described, modifications thereof may become apparent to those skilled in the art without departing from the spirit of the invention. Accordingly, it is not intended that the invention be limited by the foregoing description, but only by the scope of the appended claims.

I claim:

1. An internal coupling for joining conduit sections, said coupling being formed of a nonmetallic material characterized by high tensile, compressive and flexural yield strength and a high flexural modulus, said coupling having a generally cylindrical internal surface and a pair of axially extending coupling surface portions extending from a central portion and in each axial direction, said coupling surface portions each comprising a pair of generally diverging external surfaces formed at a relatively small oblique angle with respect to the axis of said internal surface and which have their maximum diameter ends joined and axially separated by a circumferential groove.

2. The coupling set forth in claim 1 and including a radially outwardly extending barrier annulus disposed between said axially extending coupling surface portions, said barrier annulus presenting axially facing abutment surfaces.

3. The coupling set forth in claim 1 wherein said coupling is composed of high density polyethylene.

4. The coupling set forth in claim 1 wherein the internal surface of said coupling portions flares outwardly at a relatively small angle from the central portion thereof.

5. The internal coupling set forth in claim 1 wherein said generally diverging surface portions are each generally frustoconical.

6. The coupling set forth in claim 5 wherein the small diameter end of one of the generally frustoconical surfaces of each coupling surface portion is joined to said central portion to provide a first point of flexure and said groove provides a second point of flexure between said surfaces, wherein said coupling surface portions may conform to the interior surface of the conduit sections being coupled.

7. The coupling set forth in claim 6 wherein said frustoconical surfaces intercept said generally cylindrical internal surface at a relatively small angle and wherein the internal surface of said coupling portions flares outwardly at a relatively small degree from the central portion thereof.

8. The coupling set forth in claim 7 wherein said coupling comprises high density polyethylene.

9. The coupling set forth in claim 8 and including a radially outwardly extending barrier annulus disposed between said axially extending coupling surface portions, said barrier annulus presenting axially facing abutment surfaces.

10. The coupling set forth in claim 9 wherein said angle is in the order of 2°.

References Cited

UNITED STATES PATENTS

| | | | |
|---|---|---|---|
| 1,302,022 | 4/1919 | Drewry | 285—107 |
| 2,266,270 | 12/1941 | Roth | 215—47 |
| 2,403,364 | 7/1946 | Hertzell et al. | 285—370 X |
| 2,871,034 | 1/1959 | Wiltse | 285—109 |
| 3,269,754 | 8/1966 | Bertling et al. | 285—235 X |

EDWARD C. ALLEN, *Primary Examiner.*

THOMAS F. CALLAGHAN, *Assistant Examiner.*